United States Patent
Menéndez Martin

(10) Patent No.: US 7,706,650 B2
(45) Date of Patent: Apr. 27, 2010

(54) COMPOSITE STRUCTURE WITH EMBEDDED OPTICAL FIBER AND A PROCESS FOR ITS REPAIR

(75) Inventor: José Manuel Menéndez Martin, Madrid (ES)

(73) Assignee: Airbus Espana, S.L., Madrid (ES)

( * ) Notice: Subject to any disclaimer, the term of this patent is extended or adjusted under 35 U.S.C. 154(b) by 0 days.

(21) Appl. No.: 11/441,272

(22) Filed: May 25, 2006

(65) Prior Publication Data

US 2007/0122098 A1 May 31, 2007

(30) Foreign Application Priority Data

Nov. 30, 2005 (WO) .............. PCT/ES2005/070166

(51) Int. Cl.
*G02B 6/036* (2006.01)
*G02B 6/02* (2006.01)
*G02B 6/10* (2006.01)

(52) U.S. Cl. .............. 385/128; 385/123; 385/127; 385/146

(58) Field of Classification Search ......... 385/126–128, 385/146, 123
See application file for complete search history.

(56) References Cited

U.S. PATENT DOCUMENTS

| | | | |
|---|---|---|---|
| 3,466,219 A | | 9/1969 | Schwartz |
| 3,716,869 A | | 2/1973 | Gould, Jr. et al. |
| 3,755,713 A | | 8/1973 | Paszkowski |
| 4,221,041 A | | 9/1980 | Hufnagl et al. |
| 4,318,954 A | | 3/1982 | Jensen |
| 4,580,874 A | * | 4/1986 | Winter et al. ............ 385/99 |
| 4,585,304 A | * | 4/1986 | Winter et al. ............ 385/95 |
| 4,789,416 A | | 12/1988 | Ford |
| 4,888,076 A | * | 12/1989 | Martin ............ 156/245 |
| 4,936,649 A | * | 6/1990 | Lymer et al. ............ 385/13 |
| 5,346,367 A | | 9/1994 | Doolin et al. |
| 6,035,084 A | * | 3/2000 | Haake et al. ............ 385/49 |
| 6,432,507 B1 | | 8/2002 | Brick et al. |
| 6,460,240 B1 | | 10/2002 | Kielies et al. |
| 6,960,019 B2 | * | 11/2005 | Dammann ............ 374/161 |
| 7,008,580 B2 | | 3/2006 | Eberth et al. |

(Continued)

FOREIGN PATENT DOCUMENTS

DE    103 26 422 A1    6/2003

(Continued)

OTHER PUBLICATIONS

English Abstract of DE 103 26 422 of Jun. 2003.

*Primary Examiner*—Uyen-Chau N Le
*Assistant Examiner*—Rhonda S Peace
(74) *Attorney, Agent, or Firm*—Ladas and Parry LLP

(57) ABSTRACT

The invention relates to a composite structure (11) formed by a plurality of layers (13, 15, 17, 19, 21, 23) including an optical fiber (25) for structural monitoring purposes which is at least partly embedded in said structure (11), incorporating a protective cover (27) in those areas of its embedded part susceptible to needing repair, and to a process for repairing said embedded optical fiber comprising the following steps: identifying the optical fiber area in need of repair, removing material until reaching the cover (27), extracting said area, removing the protective cover (27), repairing the optical fiber (25), relocating the repaired area in the structure and returning the removed material.

12 Claims, 5 Drawing Sheets

U.S. PATENT DOCUMENTS

| | | | |
|---|---|---|---|
| 7,283,693 B2 * | 10/2007 | Menendez Martin et al. | 385/13 |
| 7,542,632 B2 * | 6/2009 | Menendez | 385/12 |
| 2001/0019649 A1 * | 9/2001 | Field et al. | 385/100 |
| 2002/0061231 A1 * | 5/2002 | Finzel et al. | 405/154.1 |
| 2002/0150332 A1 * | 10/2002 | Aldridge et al. | 385/31 |
| 2002/0154873 A1 * | 10/2002 | Sheu | 385/114 |
| 2004/0151448 A1 * | 8/2004 | Adams et al. | 385/113 |
| 2004/0165957 A1 * | 8/2004 | Serrano et al. | 405/157 |
| 2007/0122098 A1 * | 5/2007 | Menendez Martin | 385/134 |
| 2007/0122099 A1 * | 5/2007 | Menendez Martin | 385/134 |
| 2008/0013879 A1 * | 1/2008 | Mossman | 385/13 |

FOREIGN PATENT DOCUMENTS

| | | |
|---|---|---|
| EP | 1 072 396 B1 | 6/2006 |

* cited by examiner

COMPOSITE STRUCTURE WITH EMBEDDED OPTICAL FIBER AND A PROCESS FOR ITS REPAIR

FIELD OF THE INVENTION

The present invention relates to a composite structure incorporating embedded optical fiber for structural monitoring purposes, and more particularly to a composite structure of an aircraft, as well as a process for its repair.

BACKGROUND OF THE INVENTION

The intensive introduction of advanced composites in primary structures has become a fundamental process of structural optimization (based on weight savings and the improvement of mechanical properties), one of the top priorities in the design and manufacture of a new generation of aircrafts. The introduction of an effective structural monitoring system capable of predicting the failure of load paths in a structure designed according to damage tolerance criteria would allow optimizing its design and, accordingly, reducing its weight.

Optical fiber sensors can be effectively used to measure thermomechanical deformation and even to detect damage events operating both alone in passive structural monitoring systems and in combination with other devices, forming active monitoring systems. One of their main advantages is their capacity to be embedded in composite structures, being intimately integrated into the structures.

However, one of the drawbacks of this integration is the difficulty that the repair of these optical fiber lines has once they are embedded. Optical fiber has extremely small dimensions and is fragile in handling with the tools normally used in repairing composites, therefore the possibilities of accessing it once it is embedded are very slim. This is incompatible with the reparability requirements needed when the structural health and maintenance criteria are bound to the correct working of the network of sensors integrated in the structure.

The present invention is aimed at solving this drawback.

SUMMARY OF THE INVENTION

In a first aspect, the present invention proposes a composite structure formed by a plurality of layers including an optical fiber for structural monitoring purposes which is at least partly embedded in said structure, in which the optical fiber has a tubular protective cover in those areas of the embedded part susceptible to requiring repair.

The incorporation of this protective cover facilitates access to the optical fiber for its repair or maintenance, preventing its deterioration.

In a second aspect the present invention proposes a process of repairing the optical fiber embedded in said composite structure comprising the following steps:

Identifying the optical fiber area in need of repair.
Removing part of the layers of material until reaching the optical fiber area in need of repair.
Extracting the optical fiber area in need of repair from the composite structure.
Removing the protective cover.
Repairing the optical fiber.
Optionally providing a new protective cover for the repaired optical fiber area.
Relocating the repaired optical fiber area in the composite structure.
Returning the removed parts of the layers of material.

Other features and advantages of the present invention will be understood from the following detailed description of an illustrative embodiment of its object in relation to the attached figures.

DETAILED DESCRIPTION OF THE INVENTION

Figure 1:
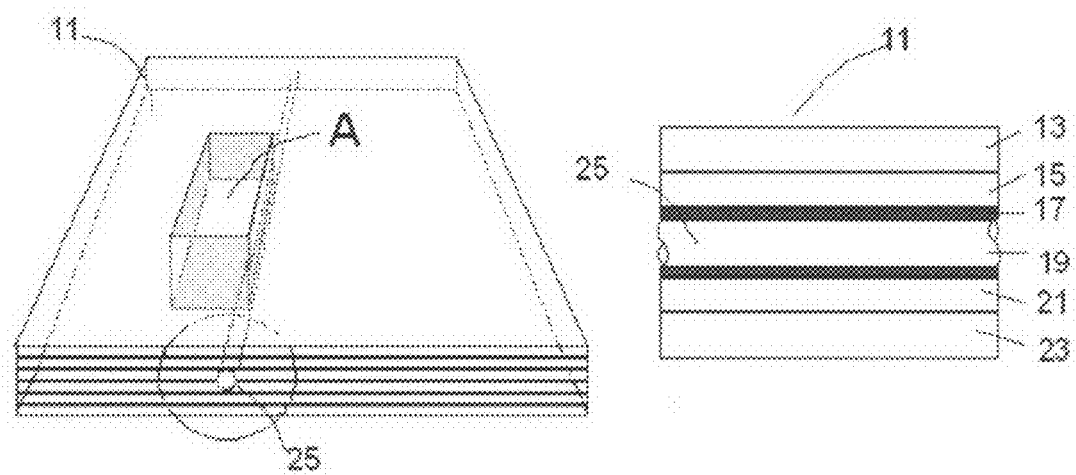
FIG. 1 shows a schematic perspective view of a composite structure known in the art formed by six layers with an optical fiber embedded between the two central layers longitudinally to the reinforcement fibers and a cross-sectional view of area A of said structure.
Figure 2:
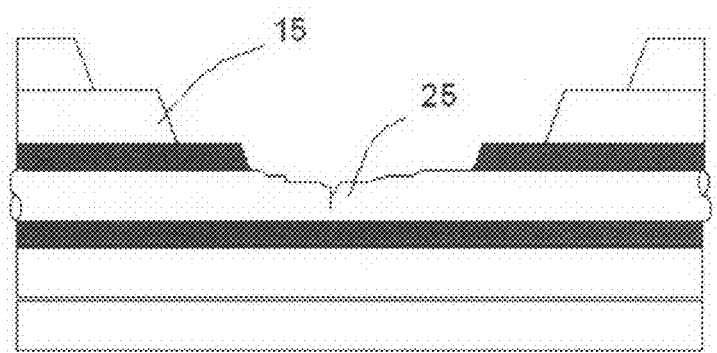
FIG. 2 shows a cross-sectional view of the structure of FIG. 1 in which, using conventional composite structure repair techniques, parts of three layers have been removed by means of sanding until reaching the embedded optical fiber that has been damaged during the process.

FIG. 1 shows a composite structure 11 known in the art formed by a plurality of layers 13, 15, 17, 19, 21, 23 with an optical fiber 25 embedded within it that can either be part of a network of sensors or it can be a data transmission element. If for any reason it were necessary to access said optical fiber 25 in order to repair it or for any type of maintenance operation, it is possible to reach it by means of composite repair techniques consisting of the local removal of parts of the reinforcement layers 13, 15, until reaching layers 17, 19 where said fiber is embedded. However, optical fiber 25 is a very fragile element and operations for removing parts of the layers 13, 15, 17 can damage it, as is shown in FIG. 2; therefore by following the process known in the art, access to the optical fiber 25 without damaging it for the purpose of extracting it is very complex and costly.

Figure 3:
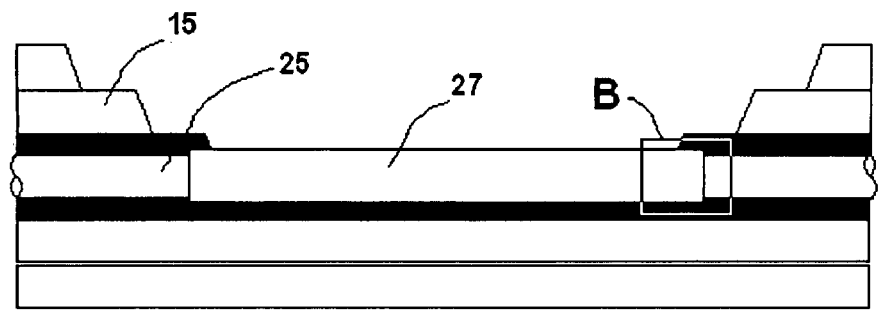
FIG. 3 shows a sectional view of a composite structure according to a first embodiment of the present invention in which the optical fiber embedded between the two central layers of the six layers forming the structure have a local protective cover.
Figure 4:
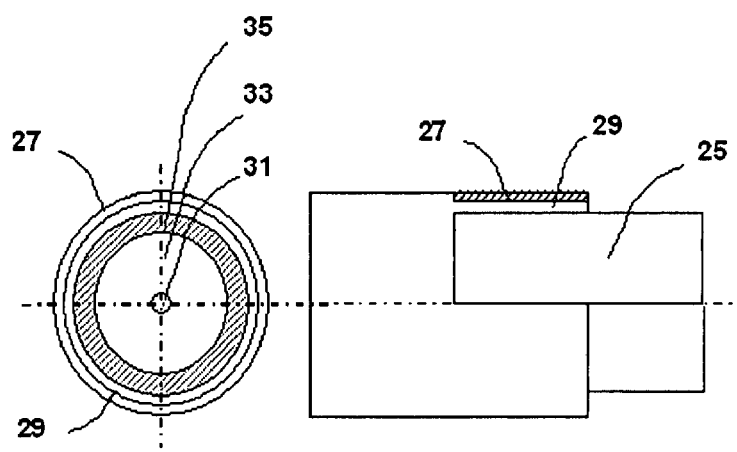
FIG. 4 shows with greater detail front sectional and cross-sectional views of part B of FIG. 3.
Figure 5:
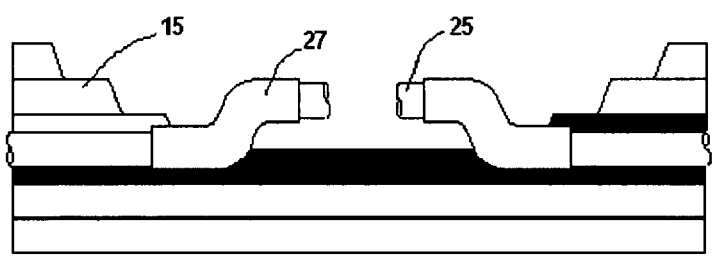
FIG. 5 shows the same view as FIG. 3 after cutting the protective cover in order to reach the optical fiber and be able to repair it.
Figure 6:
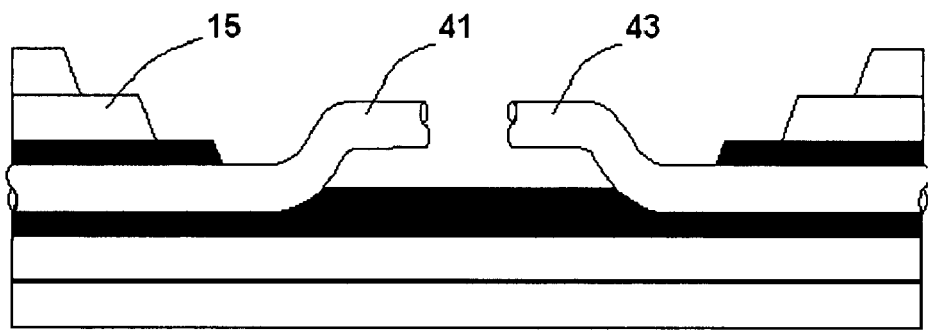
FIG. 6 shows the same view as FIG. 5 after removing the protective cover in order to reconnect the optical fiber line by joining its ends after the suitable maintenance operations.

According to the invention, the structure 11 includes a tubular protective cover 27 which allows reaching the optical fiber 25 without damaging it as is shown in FIG. 3 et seq. in order to repair it.

The possibilities of the continued existence of the optical fiber 25 increase greatly by using said cover 27 locally, protecting the optical fiber 25 formed by a core 31, a cladding 32 and a buffer coating 33.

The protective cover 27 is sized such that between it and the optical fiber 25 there is an interface 29 that can be left open during the manufacturing process of the structure so that it can subsequently be filled with the matrix resin, or it can be closed with a filler material such as silicone to prevent resin from entering the tube.

The protective cover 27 can be made of any material the toughness of which allows reaching it without damaging the optical fiber located inside it.

The protective cover 27 can further have the secondary function of facilitating detection of the fiber 25 in the structure 11 by means of non-destructive inspection techniques (X-ray, ultrasound inspection or simply a metal detector).

FIGS. 3-9 sequentially illustrate the steps comprising the process of repairing the optical fiber 25 embedded in a composite structure 11 according to the present invention in a first embodiment thereof.

Figure 7:
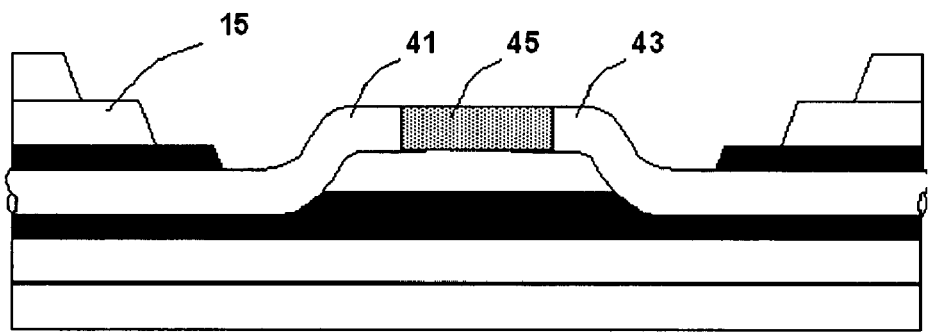
FIG. 7 shows the same view as FIG. 6 after having connected, by means of fusion splicing or any other standard process, the ends of the optical fiber.
Figure 8:
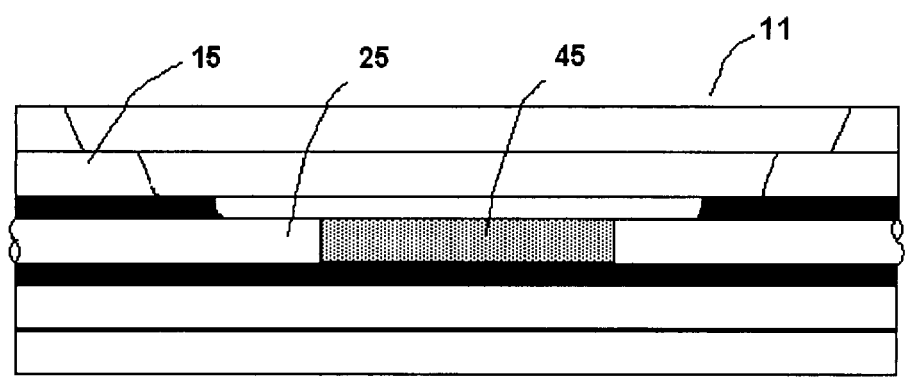
FIG. 8 shows the same view as FIG. 7 with the optical fiber repaired and the structure reconstituted.
Figure 9:
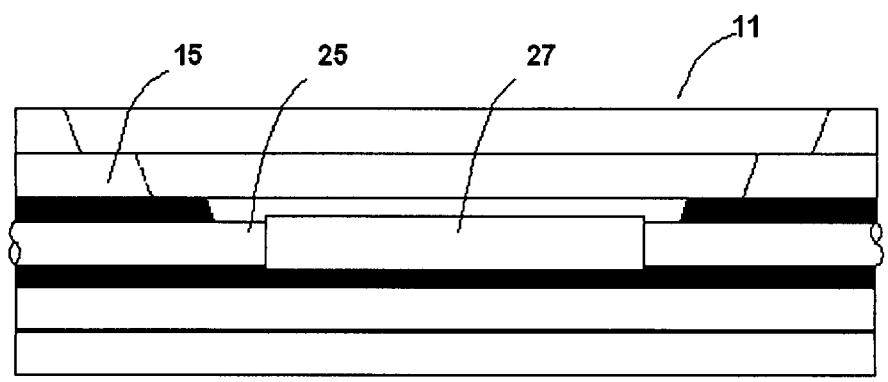
FIG. 9 shows the same view as FIG. 8 with the optical fiber inside a protective cover.
Figure 10:
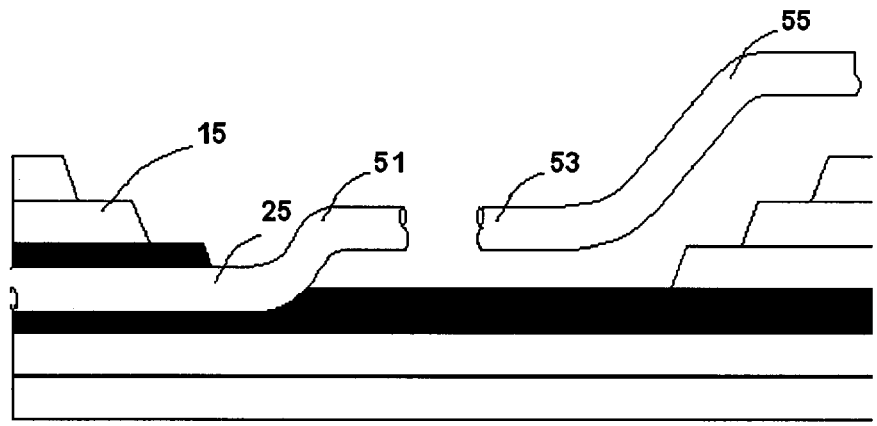
FIG. 10 shows a second embodiment of the invention in a view which is similar to that of FIG. 9, in which the embedded optical fiber is repaired by means of an external optical fiber line.
Figure 11:
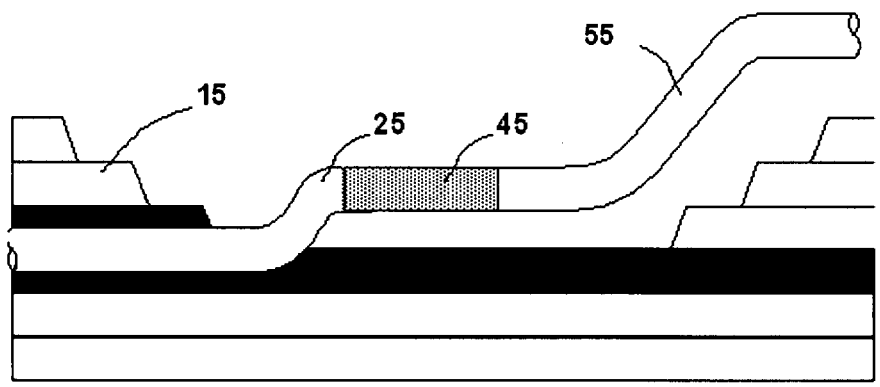
FIG. 11 shows the same view as FIG. 10 after having connected the end of the embedded optical fiber with the end of the external fiber line by means of fusion splicing or any other standard process.
Figure 12:
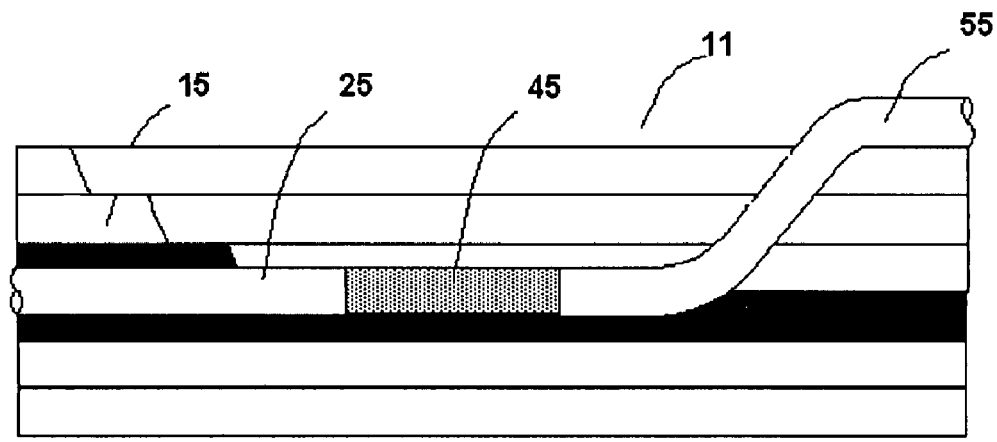
FIG. 12 shows the same view as FIG. 11 with the optical fiber repaired and the structure reconstituted.
Figure 13:
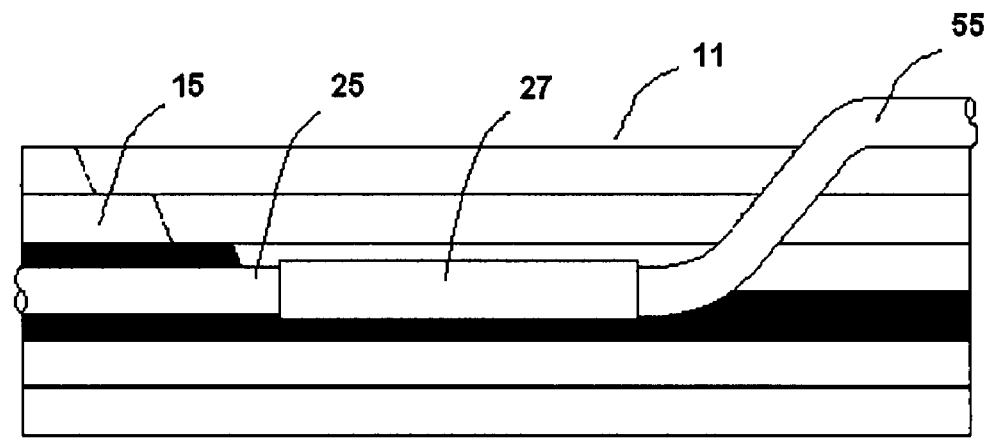
FIG. 13 shows the same view as FIG. 12 with the embedded optical fiber inside a protective cover.

Once the protective cover 27 has been accessed, after having identified the optical fiber 25 area in need of repair and having removed the parts of the layers 13, 15 and 17 necessary to do so, it will be extracted from the structure 11 and the cover 27 will be partially or completely removed (see FIGS. 5 and 6), allowing access to the fiber 25 for its repair or for performing the required maintenance operations by reconnecting again the ends 41, 43 previously separated by means of a splice 45 (see FIG. 7). After this, the optical fiber 25 would be relocated in its position inside the structure 11 and the removed parts of the layers 13, 15, 17 (see FIG. 8) will be returned. The repaired optical fiber 25 can optionally be provided with a new protective cover 27 (see FIG. 9).

In a second embodiment of the invention, the process would be similar except in that the repair of the optical fiber 25 would be performed by connecting one of the ends 51 of the embedded optical fiber 25 to one end 53 of an external optical fiber 55, therefore reconducting the optical signal through a path that is an alternative to the original one (see FIGS. 10-13).

In the preferred embodiment described above any modifications comprised within the scope defined by the following claims can be introduced.

The invention claimed is:

1. A composite structure for an aircraft comprising (a) a plurality of layers, (b) an optical fiber for structural monitoring purposes comprising at least one segment that is embedded in the plurality of layers of said composite structure, and (c) a protective cover covering a local portion of the embedded segment of the optical fiber that is susceptible to needing repair, said local portion being disposed between first and second portions of the embedded segment, the local, first and second portions being integral with each other and forming a uniform construction except that the first and second portions are not covered by the protective cover.

2. The composite structure according to claim 1, wherein the optical fiber comprises a core, a cladding and a buffer coating.

3. The composite structure according to claim 1, wherein the cover is made of a material having a tenacity that allows reaching the optical fiber that it is covering without damaging the optical fiber.

4. The composite structure according to claim 3, comprising a filler material disposed in a space provided between the protective cover and the optical fiber.

5. The composite structure according to claim 3, wherein the composite structure comprises a resin matrix and the resin matrix is also disposed in a space provided between the protective cover and the optical fiber.

6. A process of repair comprising the steps of:
(a) providing a composite structure for an aircraft having (i) a plurality of layers, (ii) an optical fiber for structural monitoring comprising at least one segment that is embedded in the plurality of layers of the composite structure and is susceptible to needing repair and (iii) a protective layer covering the at least one embedded segment, wherein the protective cover covers a local portion of the embedded segment that is susceptible to needing repair, said local portion being disposed between first and second portions of the embedded segment that are not covered by the protective cover, the local portion otherwise being integral and forming a uniform construction with the first and second portions;
(b) identifying an area of the embedded segment that is in need of repair;
(c) removing parts of the plurality of layers until reaching the protective cover in the area of the embedded segment in need of repair with the embedded segment remaining disposed among other parts of the plurality of layers;
(d) extracting the area of the segment in need of repair;
(e) repairing the segment in the area in need of repair;
(f) repositioning the repaired segment in the composite structure; and
(g) replacing the parts of the layers removed in step (c).

7. The process according to claim 6, wherein step (e) includes an additional step of providing a new protective cover for the segment in the repaired area.

8. The process according to claim 7 wherein the repaired segment connects ends of the optical fiber embedded in the composite structure.

9. The process according to claim 7, wherein the repaired segment connects one end of the optical fiber embedded in the composite structure with an end of the optical fiber disposed outside of the composite structure.

10. The process according to claim 6, wherein the repairing in step (e) comprises connecting an end of the segment to an end of a second optical fiber outside of the composite structure whereby to permit an optical signal to be conducted through a path that is different than a path in which the optical signal was conducted before repair.

11. The process according to claim 6, wherein the composite structure in step (a) is formed by first providing the optical fiber with the protective cover covering the local portion and then manufacturing the composite structure with the optical fiber and protective cover integrated therein.

12. The process according to claim 11, wherein the optical fiber is provided with an open interface between the optical fiber and the protective cover that is subsequently filled with matrix resin or filler during the manufacturing.

* * * * *